(12) United States Patent
Ziegler

(10) Patent No.: US 7,526,652 B2
(45) Date of Patent: *Apr. 28, 2009

(54) SECURE PIN MANAGEMENT

(75) Inventor: Robert Ziegler, Southlake, TX (US)

(73) Assignee: Accullink, Inc., Atlanta, GA (US)

( * ) Notice: Subject to any disclaimer, the term of this patent is extended or adjusted under 35 U.S.C. 154(b) by 717 days.

This patent is subject to a terminal disclaimer.

(21) Appl. No.: 10/764,988

(22) Filed: Jan. 26, 2004

(65) Prior Publication Data

US 2005/0055318 A1 Mar. 10, 2005

(51) Int. Cl.
*H04K 1/00* (2006.01)

(52) U.S. Cl. .................. 713/184; 713/170; 713/182; 726/4; 726/5

(58) Field of Classification Search ........... None
See application file for complete search history.

(56) References Cited

U.S. PATENT DOCUMENTS

| 4,333,090 | A | 6/1982 | Hirsch |
| 4,521,772 | A | 6/1985 | Lyon |
| 6,213,391 | B1 | 4/2001 | Lewis |
| 6,938,156 | B2 * | 8/2005 | Wheeler et al. ............. 713/170 |
| 6,941,285 | B2 | 9/2005 | Sarcanin |
| 7,188,089 | B2 * | 3/2007 | Goldthwaite et al. .......... 705/67 |
| 7,195,154 | B2 * | 3/2007 | Routhenstein ............... 235/380 |
| 7,249,054 | B2 * | 7/2007 | Keil ............................ 705/21 |

OTHER PUBLICATIONS

"International Search Report," Patent Cooperation Treaty, Application No. PCT/US03/27704, Sep. 16, 2005, p. 1.

* cited by examiner

*Primary Examiner*—Pramila Parthasarathy
(74) *Attorney, Agent, or Firm*—Lanier Ford Shaver & Payne, P.C.

(57) ABSTRACT

A system and method of secure PIN processing in a network transaction includes a transaction manager that sends terminal data to a terminal. The terminal generates corollary data from user input and the terminal data. The corollary data is sent to the transaction manager. The transaction manager then sends the corollary data and HSM data to a hardware security module. The hardware security module generates a PIN from the corollary data and the HSM data, encrypts the PIN and generates a PIN block. The transaction manager uses the PIN block and transaction data to send a transaction request to the ATM Network.

12 Claims, 6 Drawing Sheets

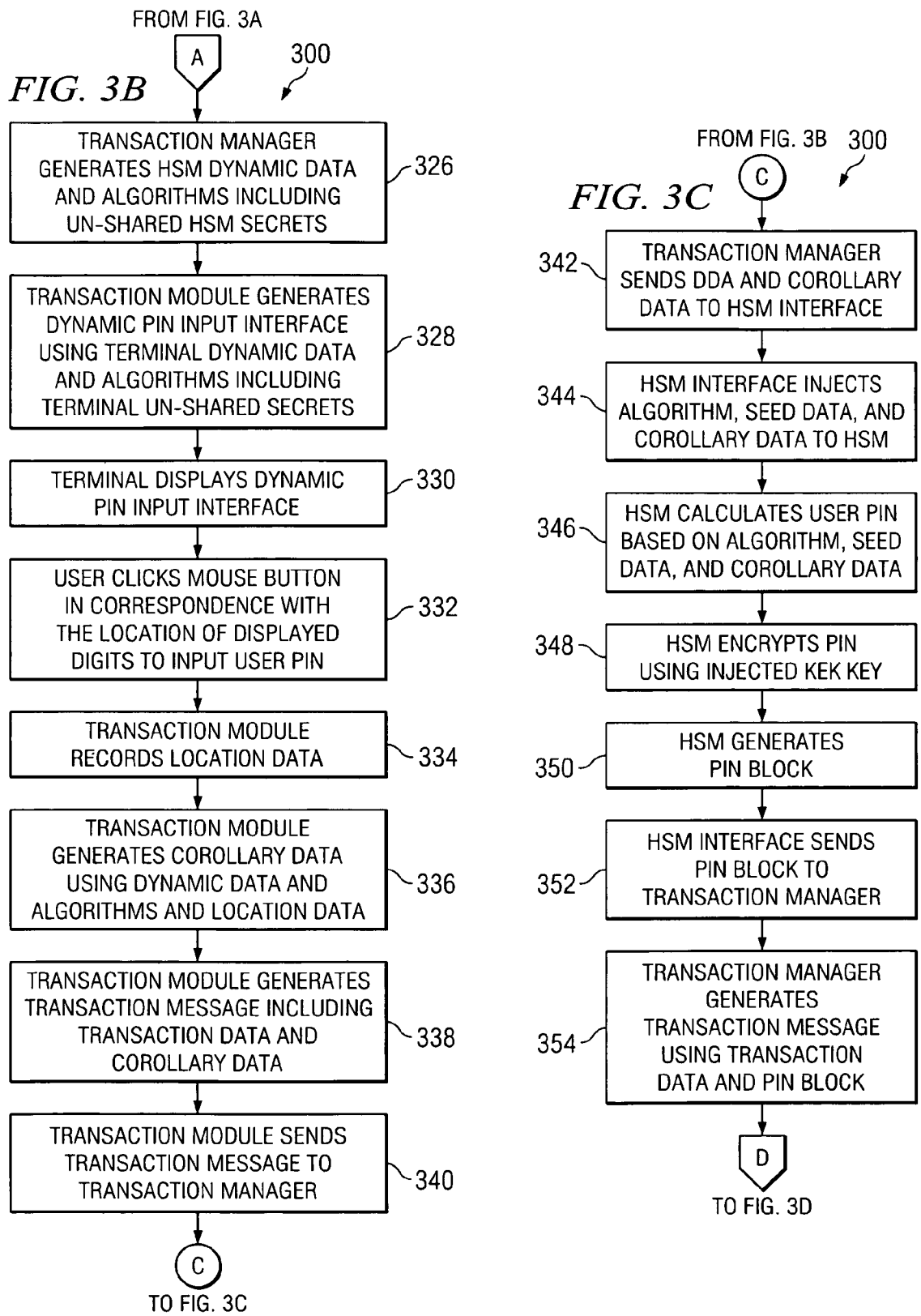

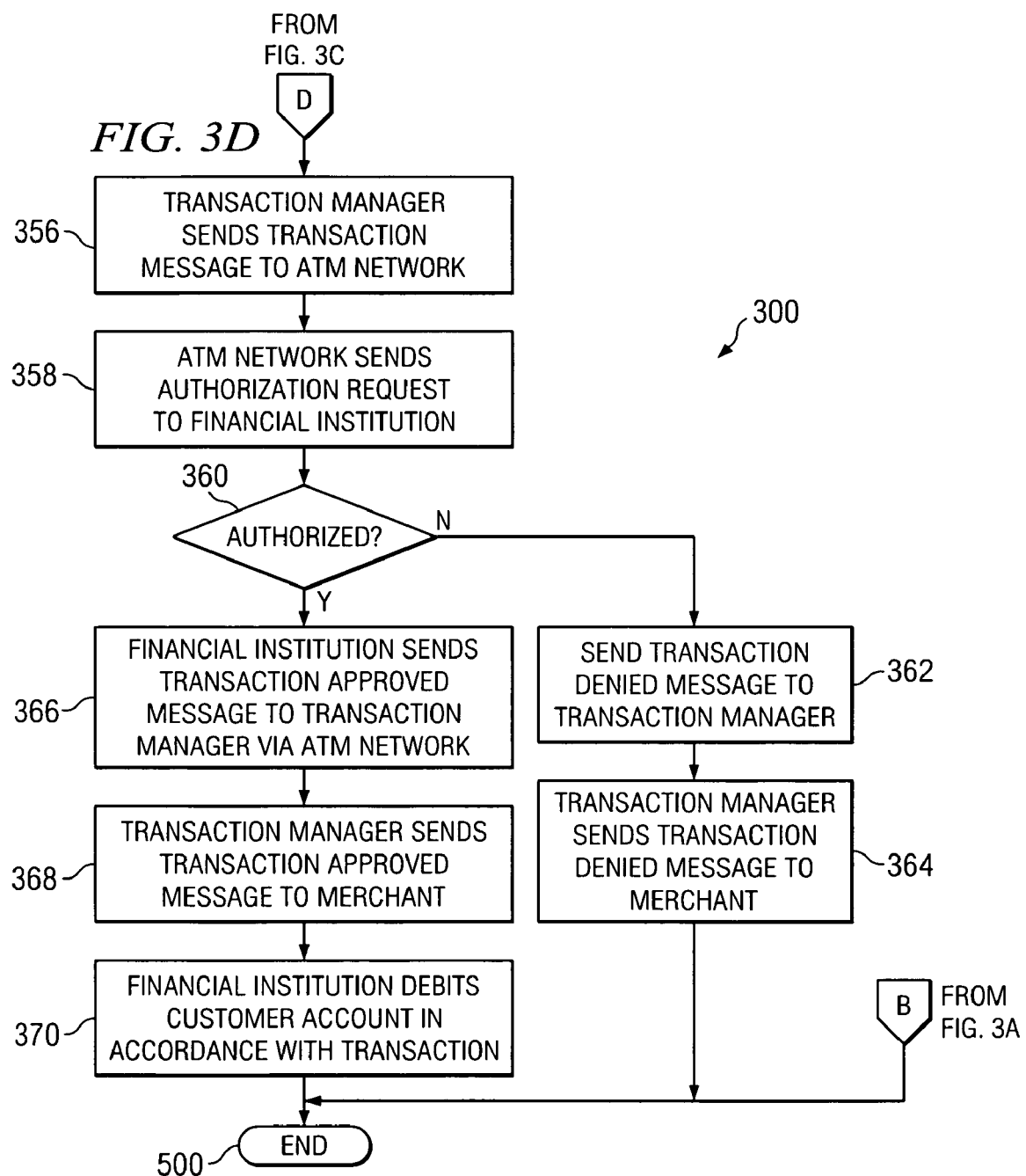

SECURE PIN MANAGEMENT

CROSS-REFERENCE TO RELATED APPLICATIONS

This application claims priority on U.S. Provisional Application 60/408,122 entitled "SECURE PIN MANAGEMENT," filed Sep. 4, 2002 and is hereby incorporated by reference. This application claims priority on PCT application PCT/US03/27704, filed Sep. 4, 2003. This application further incorporates by reference U.S. patent application Ser. No. 09/874,274 entitled "SECURE KEY ENTRY USING A GRAPHICAL USER INTERFACE," filed Jun. 6, 2001, Ser. No. 09/874,261 entitled CLIENT SYSTEM VALIDATION BY NETWORK ADDRESS AND ASSOCIATED GEOGRAPHIC LOCATION VERIFICATION," filed Jun. 6, 2001 and Ser. No. 10/264,762 entitled SYSTEM AND METHOD FOR PROCESSING PIN-AUTHENTICATED TRANSACTIONS," filed Oct. 4, 2002.

TECHNICAL FIELD OF THE INVENTION

This invention is related to security protocols, in particular for a process for securing an on-line PIN-based financial transaction.

BACKGROUND OF THE INVENTION

92% of all transactions on the Internet are conducted with credit cards. A number of problems arise in the use of credit cards, both from the perspective of the customer and the merchants. One of the most serious problems for many on-line merchants comes from the fact that credit card transactions can be reputed with a single phone call. One of the reasons why Internet credit card transactions can be reputed so easily and effectively is that the customer is never authenticated. Particularly where services are concerned, the inability to verify the identity of the customer is a serious flaw in the nature of on-line credit card transactions.

On the other hand, ATM or Debit card transactions, where the transaction has been verified with a PIN can not be reputed. By including PIN entry in a transaction, the identity of the customer can be authenticated. However, the EFT network is governed by rules designed to safeguard the various parties in an ATM transaction. In particular, the security of the PIN is subject to strict controls. Most proposals to introduce the advantages of ATM transactions to the on-line environment, however, fail to adequately protect the PIN from being compromised.

Some solutions approach the PIN security issue by proposing the introduction of additional secure hardware and/or additional communication routes to every customer computer. These types of solutions introduce costs to the system that will be an obstacle to widespread acceptance of the solution by the general public.

What is needed, therefore, is a system and method of providing secure PIN-based transactions over the Internet without requiring additional hardware or communication lines for the customer.

SUMMARY OF THE INVENTION

A system and method of secure PIN processing in a network transaction includes a transaction manager that sends terminal data to a terminal. The terminal generates corollary data from user input and the terminal data. The corollary data is sent to the transaction manager. The transaction manager then sends the corollary data and HSM data to a hardware security module. The hardware security module generates a PIN from the corollary data and the HSM data, encrypts the PIN and generates a PIN block. The transaction manager uses the PIN block and transaction data to send a transaction request to the ATM Network.

BRIEF DESCRIPTION OF THE DRAWINGS

For a more complete understanding of the present invention and the advantages thereof, reference is now made to the following description taken in conjunction with the accompanying Drawings in which:

FIGS. 3A-D illustrates a flowchart of a secure PIN processing system process.

DETAILED DESCRIPTION OF THE INVENTION

Figure 1:
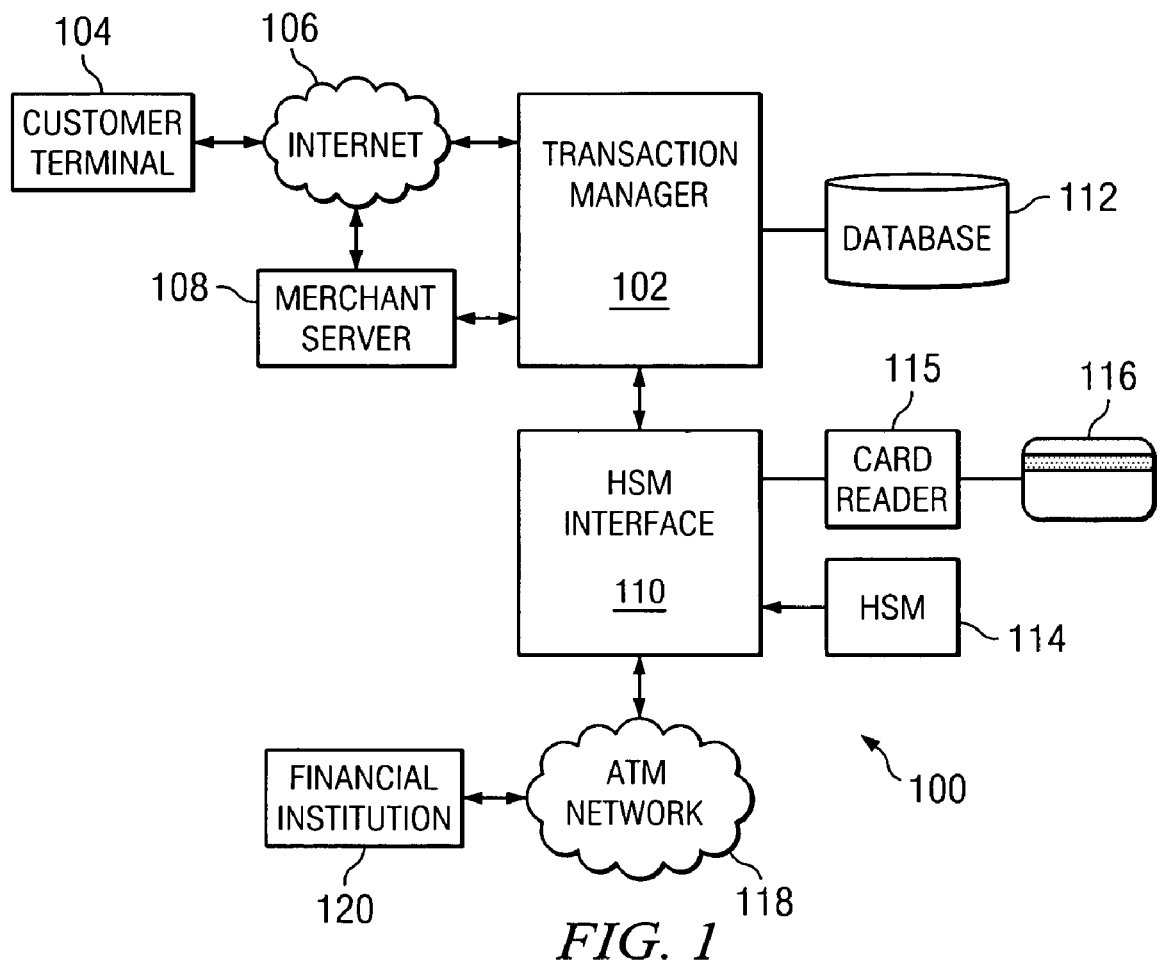
FIG. 1 illustrates a secure PIN processing system.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

With reference to FIG. 1, a secure PIN processing system 100 is shown. In accordance with the preferred embodiment, the secure PIN processing system 100 serves as a part of an on-line commercial transaction process. It should be understood that the secure PIN processing system 100 may be used in other network transaction environments, typically in processes where a party must be authenticated without the insecure transfer of authenticating data. A personal identification number (PIN) is a sequence of numerals, where the number of digits creates a sufficiently high probability that a person in possession of the PIN can be positively identified as a specified person. PIN are most commonly used in association with bank debit cards. Bank debits cards are used at automated teller machines (ATM) connected to the ATM Network. When the customer presents the card to the ATM, the ATM prompts the customer to enter a PIN. The customer enters the PIN into the ATM. The ATM processes the PIN and data read from the bank debit card to identify the customer presenting the card as the legitimate owner of the card. The process for PIN-based transactions with debit cards at ATM is heavily regulated.

For purposes of the disclosure, a PIN may be any sequence of numbers used to identify, particularly where the identification is part of a transaction. Inasmuch as the ATM Network has specific requirements, the preferred embodiment is tailored to that use. It will be apparent to those having skill in the art that the same protocols can be used in a wide variety of situations, particularly situations where identification is part of a network transaction. Debit cards are only one example of tokens that may be associated with a PIN. Credit cards, identification cards, keyfobs, cellular telephones, personal digital assistants, computers, portable computers and computing devices, smart cards and passive or active transmitters are examples of types of tokens that may be identified with a holder by a PIN. Serial numbers, passwords, biometrics, identification numbers, registration numbers, student identification numbers, network passwords, including numerals, characters or any graphic symbol, are examples of sequences that may act as a PIN.

In the on-line commercial transaction process, a customer using a customer terminal 104 is connected to an open network 106 such as the Internet. The customer terminal 104 is preferably a personal computer at use in a home or office. It should be understood that the customer terminal 104 may be any digital device that can be communicably connected to an open network 106 and is capable of receiving data input by the customer and processing the data input by the customer before transmission to the open network 106.

Typically, the customer at the customer terminal 104 is connected to a merchant server 108 via the Internet 106. The merchant server 108 may offer goods or services for sale to the customer, with one or more web pages serving as consumer interfaces. When the customer has made appropriate selections at the merchant web site, payment options are typically given to the customer. Communication between the customer terminal 104 and the merchant server 108 will typically be conducted using a secure socket layer (SSL) connection, although the security of the transaction communication may be in accordance with another protocol or even made in the clear, depending on the security needs dictated by the specific transactions and protocols. In accordance with the present embodiment, when a debit-type transaction where money is transferred from a customer bank account at a financial institution 120 via the ATM network 118 is selected, the transaction is initiated, typically by a transaction initiation message sent from the customer terminal 104 through the open network 106 to the merchant server 108.

When a transaction initiation message is received at the merchant server 108, the merchant server 108 communicates the transaction initiation, including transaction details, merchant details and customer details, to the transaction manager 102. Communications between the merchant server 108 and the transaction manager 102 are typically conducted using a dedicated communication network or a virtual private network (VPN). Some communications between the merchant server 108 and the transaction manager 102 may be conducted via the open network 106, but because of the confidential nature of the financial transaction, communication between the merchant server 108 and the transaction manager 102 will typically use a secured connection.

The merchant server 108 will establish a connection between the customer terminal 104 and the transaction manager 102. This connection will typically be established in such a way that the customer at customer terminal 104 is generally unaware that the customer is communicating with the transaction manager 102 instead of the merchant server. However, once the connection is established between the customer terminal 104 and the transaction manager 102, the merchant server 108 is privy to none of the data exchanged between the customer terminal 104 and the transaction manager 102. This protocol prevents the merchant server 108 from intercepting the communications between the customer terminal 104 and the transaction manager 102 and gaining access to confidential financial or personal data, as well as preventing man-in-the-middle attacks on the system.

The transaction manager 102 is communicably connected to a transaction manager database 112. The transaction manager database 112 stores algorithms and other data used in the transactions. When the customer terminal 104 initiates a first transaction, the transaction manager 102 retrieves a copy of a transaction module from the transaction manager database 112 and sends a transaction module to the customer terminal 104. The transaction module secures the customer terminal 104 and regulates the transaction process at the customer terminal 104. The transaction manager database 112 may store algorithms used to generate a dynamic PIN input interface, encryption algorithms, components of encryption algorithms and other data used as unshared secrets. The algorithms and data stored in the transaction manager database may be organized in families of data, such that when a DDA family is available to a transaction module, the processing steps may be chosen by identifying portions of the DDA family and with data to determine the variables used in the creation of corollary data.

The transaction manager 102 is communicably connected to a Hardware Security Module (HSM) interface 110. The HSM interface 110 may be a secure configuration terminal (SCT). The connection between the transaction manager 102 and the HSM interface 110 is typically a secured line connection. The HSM interface 110 is connected directly to an HSM 114. The HSM 114 or the HSM interface 110 may include an card reader 115 for reading data from a key card 116.

In accordance with the preferred embodiment, the Hardware Security Module 114 is a programmable or intelligent HSM. A programmable HSM is, generally, an HSM that is capable of interpreting injected data as programmatic instructions. Programmatic instructions may refer to executable images like an application written in a programming language such as assembly code, C or C++. Runtime images like a JAVA application may be used as programmatic instructions.

By programming the intelligent HSM, the HSM may implement programmed behavior either statically or dynamically. In this way, the HSM may be programmed to securely interact with the cryptography functions of the HSM. Applications may be downloaded into the HSM using any secure methodology. For example, the applications may be input into the HSM using a serial port, a network adaptor, smart cards, floppy disks, cd-roms, an infrared port or any other known input mechanism. In accordance with the preferred embodiment, a smart card 116 may be used to inject algorithms, keys or other secure data into the HSM 114.

The executable code injected into the HSM 114 is typically authenticated using a digital signature of the executable code generated by an authorized publisher. Other authentication methods may be used. The executable image, when executed, is programmed so that data is exchanged between the HSM 114, the HSM interface 110 and other connected systems in a secure manner. In particular, the programming prevents compromise of the HSM 114 including the algorithms and keys stored therein. The HSM 114, in accordance with the preferred embodiment, is capable of both reading and writing to smart card 116.

The HSM 114 is, in accordance with the preferred embodiment, a Tamper Resistant Security Module (TRSM), preventing physical as well as logical intrusion. Using approved software components, a customized secure configuration terminal (SCT), ACL definitions, policies and procedures, the programmable HSM 114 can be made to meet X9 key management requirements. In particular, the HSM 114 can perform X9 compliant key exchange keys, split knowledge key management, dual control, key fragments, key pair generation, key injection, key combining, key exchange, key loading, key recovery, destruction of keying material, key management with encrypted keys, PIN block creation, PIN block translation, PIN management with encrypted PIN. The HSM 114 may be an X9 compliant tamper proof enclosure with key destruction when the enclosure of the HSM has been compromised. Policies and procedures for these processes are made auditable and verifiable.

The HSM 114 may be encased in a durable, tamper-resistant casing to protect the system against intrusion, with built-in detection features capable of sensing sophisticated attempts at physical or electronic tampering. An unauthorized attempt to access the HSM results in the immediate and automatic erasure of the secured algorithms and data stored in the HSM 114. The HSM 114 is a TRSM capable of enforcing key confidentiality and separation. The HSM 114 allows dual control, tamper detection and active countermeasures such as automatic key erasure upon compromise. These types of devices and environmental security measures currently exist in many systems of financial institutions, network processing centers and military installations.

The HSM 114 may also use access control lists to allow fine-grained control over key separation, key injection and key management. The HSM 114 will preferably be programmed so that it will only accept authenticated trusted code provided by an authenticated trusted publisher. Authentication of the trusted code and trusted publisher is typically achieved using an appropriate digital signature authentication protocol.

The HSM 114 may be programmed to refuse to load trusted code during key loading processes. The HSM 114 may be programmed to restrict code loading in accordance with X9 audit procedures. The HSM 114 should pass FIPS-140 validation requirements. The HSM 114, in conjunction with an SCT and approved key management practices allow for the management of keys for injection into devices that are physically or geographically separate, as may be required for business continuance best practices. The HSM 114, in conjunction with an SCT, can meet or exceed all key management practices required by the X9 TG-3 audit guidelines or associated standards.

To make the HSM 114 compliant with X9 requirements, the programmed HSM 114 requires that private keys and symmetric keys exist in an acceptable secure format. The keys may be rendered as cleartext inside the protected memory of a tamper resistant security module, or encrypted when rendered outside of the protected memory of a tamper resistant security module. The keys may be rendered as two or more key fragments or key components either in cleartext or ciphertext and managed using dual control with split knowledge fragmentation of the keys. Secret-sharing enables the key fragments to be stored separately on tokens so that less than all of the key fragments (k-of-n key fragments) are required to load or reconstitute the key being protected. Good security practice requires key separation, whereby each key or key pair is generated for a particular purpose and used solely for the purpose for which it was intended.

The HSM interface 110 may be interfaced directly or indirectly with the HSM 114 for loading the key-encryption-key (KEK), key pairs as well as any other activity necessary to meet X9 standards for key management. Accordingly, the HSM interface 110 may be connected directly to the HSM 114, for example using an SCSI, IDE, serial port, parallel port, USB port, keyboard, mouse, or firewire port. The HSM interface 110 may be connected indirectly to the HSM 114, for example using an infra-red port. The HSM interface 110 may be interoperable with the HSM 114 via use of smart cards with supporting processes and procedures to insure key management policies and procedures can be implemented. Future connection methodologies that comport with the required standards may also be used.

The HSM interface 110 may be encased in a durable, tamper-resistant casing to safeguard the system against incursion. The HSM interface 110 should also include built-in detection techniques capable of sensing sophisticated attempts at physical or electronic tampering. These techniques may provide for immediate and automatic erasure of secured algorithms and data stored in the device.

In accordance with one embodiment, the HSM interface 110 may provide graphics display, allowing it to support a variety of graphic character sets, including Japanese, Chinese, Arabic and Cyrillic-based languages. The display may be configured to show two lines of Chinese prompts, two lines of large characters or up to four lines of Roman text. The HSM interface 110 may be capable of displaying two languages simultaneously, such as French and English, for use in multi-lingual environments.

The HSM interface 110 may be configured to support custom application development and remote downloading of an executable image. The download process will typically require a trusted code source and use executable code that is authenticated, through a digital certificate, hash, MAC or other methodology sufficient to prove the authenticity and integrity of the executable code.

The HSM interface 110 may provide access control using smart cards, token devices, passwords or other methodology. Access control is used to insure that code downloads can only be accomplished by authorized trusted entities. Use of the HSM interface 110 may be restricted using access control. Key loading is restricted to authorized parties using access control. Key injection is restricted to authorized parties using access control. Software download is restricted to proprietary protocols and otherwise restricted using access control.

The HSM interface 110 insures that access to any keying information entered can not be controlled or denied to one or all users of the HSM 114. The HSM interface 110 may provide an interface for the HSM 114. The HSM interface 110 may provide simultaneous support for multiple key management functions. The HSM interface 110 may provide comprehensive software security and tamper-proof casing. The HSM interface 110 may store keys securely in a security chip. The HSM interface 110 may include the ability to wipe keys from the security chip upon completion of keying activity if required. The HSM interface 110 may provide secure communications between a keyboard, a display and a security module. The HSM interface 110 may provide a PIN pad that supports alpha-numeric entry. The HSM interface 110 may provide a smart card reader and writer supporting a plurality of asynchronous and synchronous memory and protected-memory cards. The HSM interface 110 may include a magnetic strip reader that can read and write Track 1 and 2 or Track 2 and 3. The HSM interface 110 may provide a serial interface.

The HSM interface 110 smart and magnetic card reader 115 may provide a secure and verifiable erasure feature to insure no residual keying material exists after keys have been injected or keying material has been discarded. This may be implemented as a procedure that requires erasure of the material be performed and verified to substantive level. The card reader and writer 115 may support both EMV for smart card support, debit cards, credit cards, and ATM cards.

The HSM interface 110 may be both physically and electronically secure, and may contain an integral security module, with an encryption chip, that offers simultaneous support for encryption and key management functions. The security module may be provided to work with DES, Triple DES, RSA encryption, and supports Master/Session Key, DUKPT (derived unique key per transaction) and regional key management methods.

The HSM interface 110 may provide additional features that are not required to secure the HSM 114, as the device may include higher order utility capabilities for acting as a PIN pad in online and offline debit transactions.

The HSM interface 110 is communicably connected, typically by a secure line connection, to a closed network 118 such as the ATM Network. This closed network 118 provides communication to one or more financial institutions 120. Transaction for the transfer of monies from one account to another is performed by communications transmitted through the ATM Network 118.

In typical prior art systems, using software-based cryptography, all of the cryptographic components (i.e., algorithm, key, cleartext, ciphertext) reside in unprotected memory, where they are susceptible to duplication, modification, or substitution. The most susceptible element is the cryptographic key. A duplicated key allows an attacker to recover all encrypted data. In addition a duplicated asymmetric private key allows an adversary to falsely generate digital signatures that would be attributed to the computer owner. A substituted or modified public key would allow a "man-in-the-middle" attack such that the adversary could intercept and change e-mails or transaction data undetectable by the sender or receiver.

In the hardware-based cryptography, physical and logical barriers limit data access, while the algorithm and key are kept secure in the protected memory of the HSM 114. Thus, hardware based cryptography ensures the confidentiality, integrity, and authenticity of cryptographic keys and, further, provides assurance regarding the integrity and authenticity of the cryptographic algorithm, which reinforces the overall level of security.

The secure PIN processing system 100 insures that the key management policies, practices and lifecycle controls which deal with an organization's policies and practices regarding the management of private asymmetric keys, symmetric keys, and other types of keying material (e.g., pseudo-random number generator seed values), including cryptographic hardware management. Key management life cycle control information should be disclosed to allow relying parties to assess whether the organization maintains sufficient controls to meet its business requirements and insure key generation practices, such that cryptographic keys are generated in accordance with industry standards.

The secure PIN processing system 100 manages the random or pseudo-random number generation process, prime number generation, key generation algorithms, hardware and software components. The secure PIN processing system maintains adherence to all relevant standards as well as references to the key generation procedural documentation including key storage and backup. Asymmetric private keys and symmetric keys remain secret and their integrity, authenticity and recovery practices may be retained. The secure PIN processing system 100 allows the use of key separation mechanisms using hardware and software components. This permits provable adherence to all relevant standards and provides references to key storage, backup, and recovery procedures. The secure PIN processing system 100 controls the initial key distribution processes, subsequent key replacement processes, and key synchronization mechanisms.

The secure PIN processing system 100 relies on the HSM 114 not just for security but also to insure the cryptography which is CPU intensive is optimized for high scalability and is capable of supporting diverse applications. The secure PIN processing system and process 100 may dramatically increase the number of cryptographic keys generated, distributed, installed, used, and eventually terminated. This proliferation will stress the scalability of key management software and the key storage mechanisms that will be forced to manage more and more cryptographic keys.

Figure 2A:
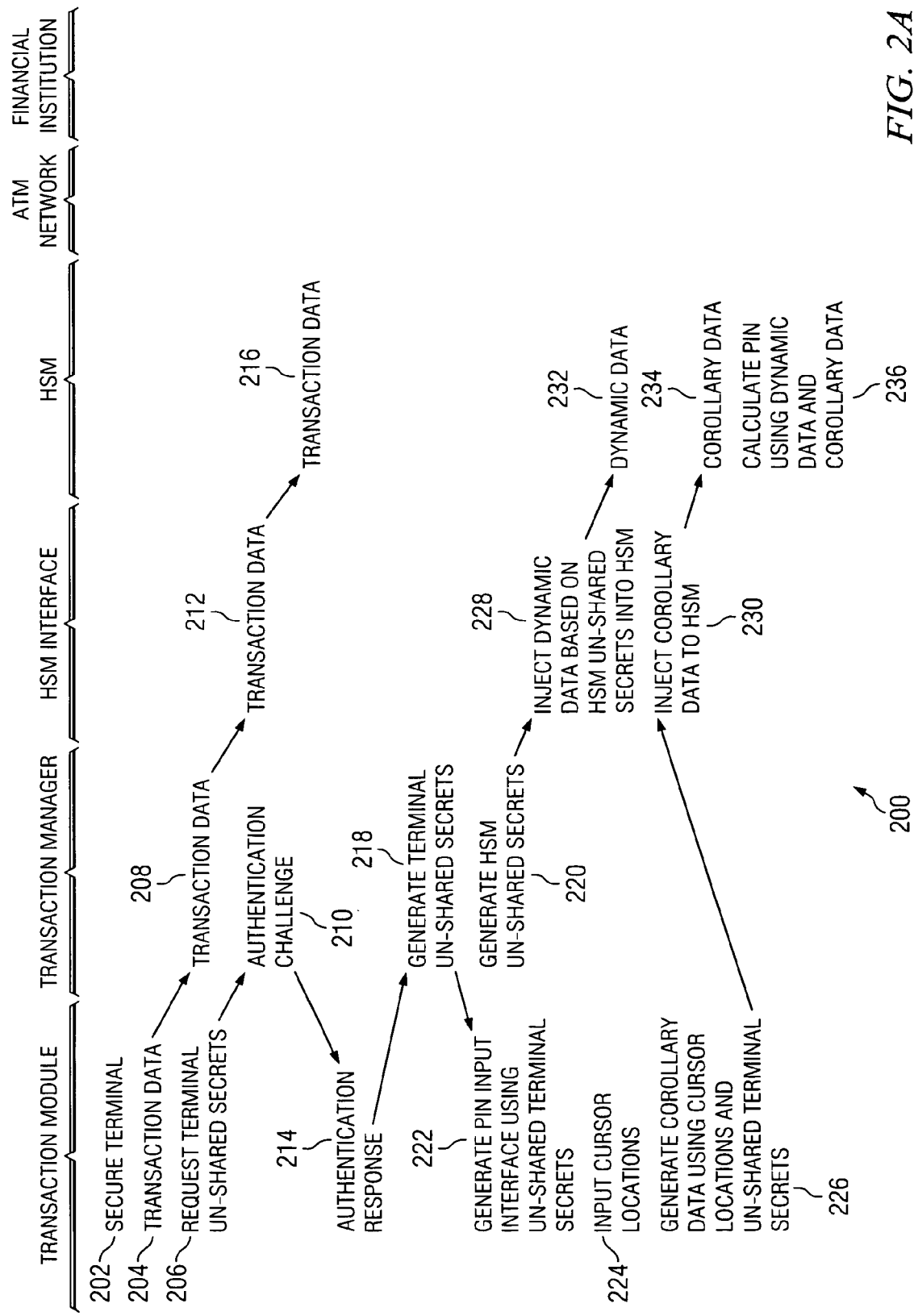
FIGS. 2A and 2B illustrate a communication flow chart of a secure PIN processing system.
Figure 2B:
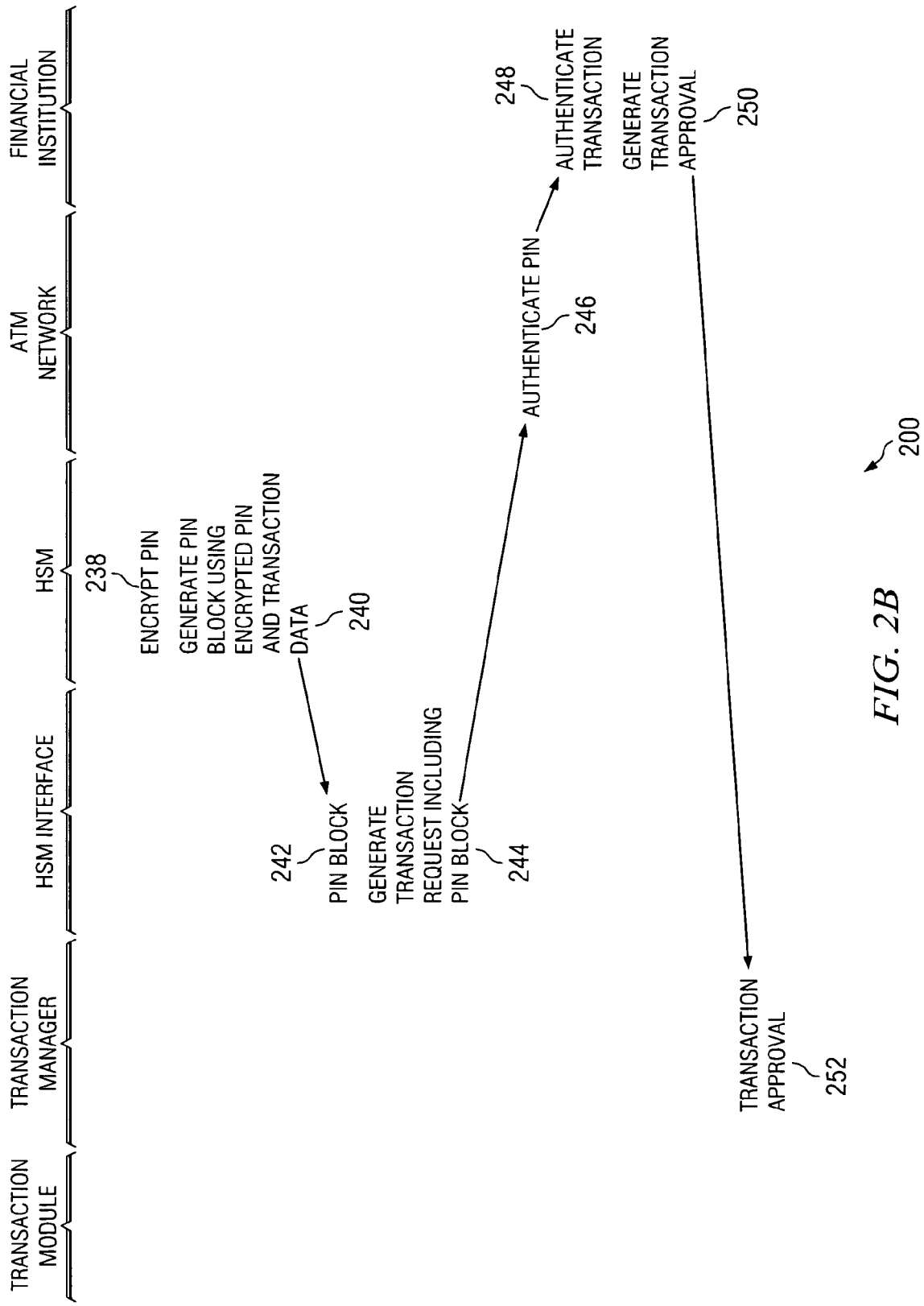
Figure 3A:
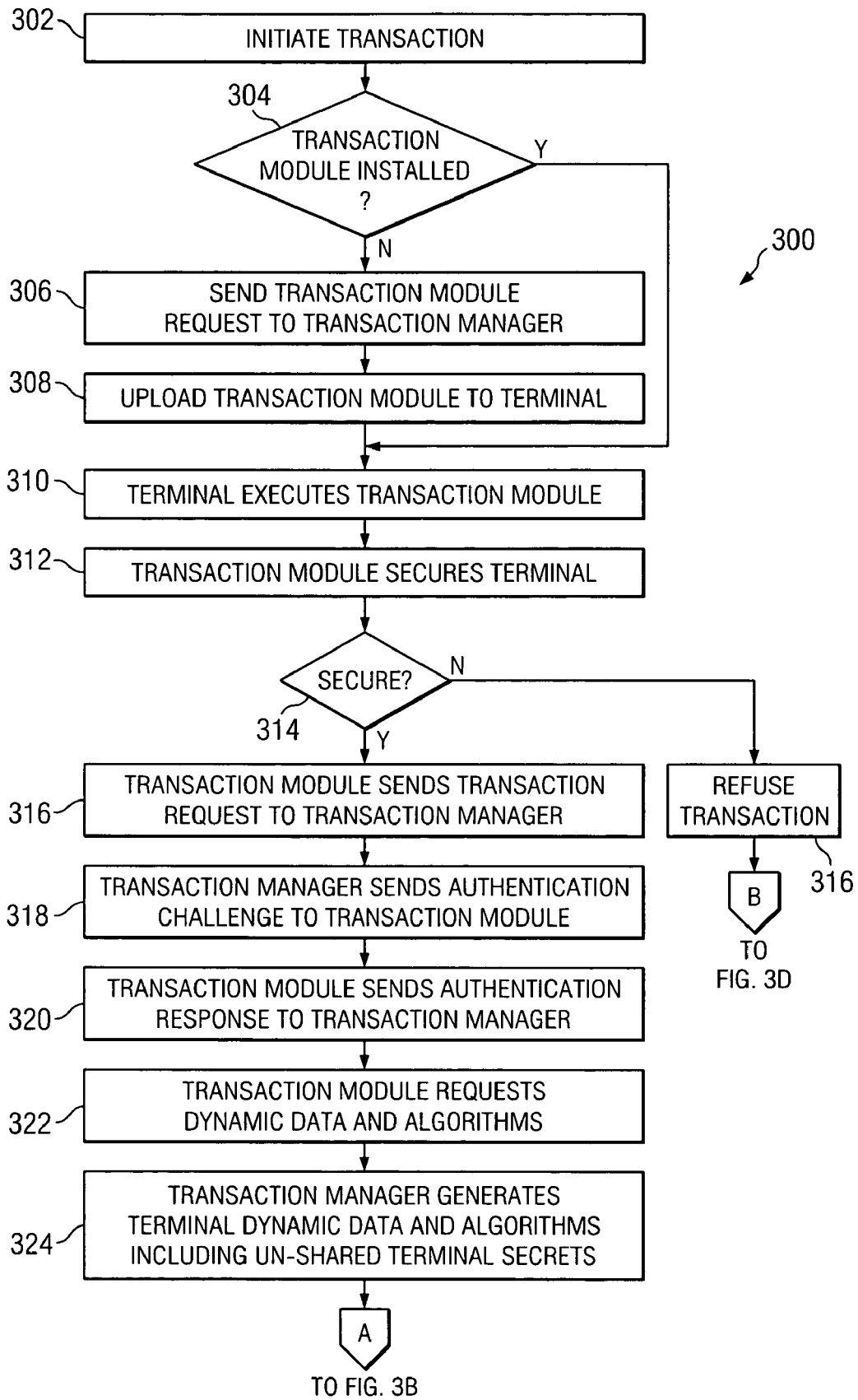

With reference to FIGS. 2A and 2B, a communication flow chart for the secure PIN process 200 is shown. When the transaction module is executed, the transaction module performs a procedure for securing the customer terminal 104 in step 202. The process for securing the customer terminal 104 may include checking the location, registry and memory of the customer terminal 104. The transaction module checks to see if there is any indication that the transaction process may be rendered insecure by the customer, customer software or customer hardware. A port scan is performed. The customer terminal 104 interrupts and vectors are checked. The transaction module searches for hardware crackers. The goal is to insure that the customer terminal 104 is a generic computer running generic software. If the transaction module determines that the customer terminal 104 is for any reason insecure, the transaction process is terminated.

When the customer terminal is determined to be secure, the transaction module sends transaction data to the transaction manager 102 in step 204. Some or all of the transaction data may be sent by the transaction manager 102 to the HSM interface 110 in step 212. Some or all of the transaction data may also be sent by the HSM interface 110 to the HSM 114. The specific transaction data shared by the transaction module, transaction manager 102, HSM interface 110 and the HSM 114 depends on the particulars of the protocols underway.

The transaction module requests terminal unshared secrets from the transaction manager 102 in step 206. Typically, the transaction manager 102 sends an authentication challenge to the transaction module in step 210. An authentication response is sent by the transaction module to the transaction manager 102 in step 214. The interchange of authenticating data may be performed in a variety of ways. The authentication may be bi-directional, such that the transaction module is authenticated to the transaction manager 102 and the transaction manager 102 is authenticated to the transaction module. The authentication may take place at other times during the process, and may be repeated in some protocols. Because the identity of the participants are especially important in a financial transaction, a wide variety of authentication protocols and procedures may be implemented to accomplish that goal.

The transaction manager 102 generates terminal unshared secrets in step 218 and HSM unshared secrets in step 220. The terminal unshared secrets are used to allow the transaction module to properly form and encode corollary data used to identify the PIN of the customer. The HSM unshared secrets are used by the HSM 114 to convert the corollary data into the customer PIN. The unshared secrets may include algorithms, portions of algorithms, families of algorithms, identifiers for selecting algorithms, portions of algorithms or families of algorithms. The unshared secrets may include data to modify the algorithms. Variables may be established by the unshared secrets.

The transaction manager 102 sends the terminal unshared secrets to the transaction module and send the HSM unshared secrets to the HSM 114. The transaction module generates a graphical PIN input interface for display on the customer terminal 104 using the unshared terminal secrets in step 222. The customer selects displayed portions of the graphical PIN input interface using a mouse to generate cursor location data in step 224. In accordance with the preferred embodiment, the graphical PIN input interface includes a graphical display of a numeric keypad, such the customer selects a digit of the PIN by clicking a mouse button when the mouse cursor is over the appropriate numeral. With each entered digit, the displayed keypad may be scrambled, such that a given mouse cursor location may indicate a different numeral with each entered digit. The cursor location data for each digit of the PIN is recorded by the transaction module. The transaction module then generates corollary data using the cursor location data and the unshared terminal secrets in step 226. The corollary data is sent to the transaction manager 102 which further sends the corollary data to the HSM interface 110.

The HSM interface 110 injects dynamic data into the HSM 114 using the unshared HSM secrets in step 228. The HSM interface 110 injects the corollary data into the HSM 114 in step 230. The HSM 114, using the transaction data 216, the dynamic data 232 and the corollary data 234, calculates the customer PIN in step 236.

The HSM 114 encrypts the PIN in step 238. The HSM 114 generates a PIN block using the encrypted PIN and transaction data in step 240. The HSM 114 sends the PIN block to the HSM interface 110 in step 242. The HSM interface 110 generates a transaction request including the PIN block in step 244 and sends the transaction request to the ATM Network 118. The ATM Network 246 or the financial institution 120 authenticates the PIN in step 246. The financial institution 120 authenticates the transaction in step 248. The financial institution 120 then generates a transaction approval message in step 250 and sends the transaction approval message to the transaction manager 102 in step 252. The transaction manager 102 notifies the merchant server that the transaction has been processed.

With reference to FIGS. 3A, 3B, 3C and 3D, a flowchart of the secure PIN processing process 300 is shown. The process begins as the transaction is initiated in function block 302. A check is done to determine if the transaction module has been installed at the customer terminal 104 at decision block 304. If a transaction module has not been installed, the process follows the NO path to function block 306, sending a transaction module request to the transaction manager 102. The transaction manager 102 retrieves the transaction module file from the transaction manager database 112 and uploads the transaction module to the customer terminal 104 at function block 308 and proceeds to function block 310.

If the transaction module was previously installed, the process follows the YES path to function block 310. At function block 310, the customer terminal 104 executes the transaction module. The transaction module then secures the customer terminal 104 at function block 312. A check is made to determine if the customer terminal 104 is secure at decision block 314. If the customer terminal is not secure, the process follows the NO path to function block 316 where the transaction is refused. The process then ends at block 500.

If the customer terminal is determined to be secure, the process follows the YES path to function block 316. The transaction module sends a transaction request to the transaction manager 102 at function block 316. The transaction manager 102 sends an authentication challenge to the transaction module at function block 318. The transaction module sends an authentication response to the transaction manager 102 at function block 320. If the authentication is not verified, the transaction is refused. The transaction module requests dynamic data and algorithms at function block 322. The transaction manager generates terminal dynamic data and algorithms including unshared terminal secrets at function block 324.

The transaction manager 102 generates HSM dynamic data and algorithms (DDA) including unshared HSM secrets at function block 326. The transaction module generates a dynamic PIN input interface using terminal dynamic data and algorithms including unshared terminal secrets at function block 328. The customer terminal 104 displays the dynamic PIN input interface at function block 330. The user clicks the mouse button in correspondence to the location of a cursor over displayed digits in the dynamic PIN input interface in function block 332. The transaction module records the cursor location data at function block 334. The transaction module generates corollary data using the dynamic data and algorithms and the cursor location data at function block 336.

The transaction module generates a transaction message including transaction data and corollary data at function block 338. Proceeding to function block 340, the transaction module sends the transaction message to the transaction manager 102. The transaction manager sends the dynamic data and algorithms and the corollary data to the HSM interface 110 at function block 342. The HSM interface 110 injects the HSM dynamic data and algorithms, seed data and corollary data to the HSM 114 at function block 344. Proceeding to function block 346, the HSM 114 calculates the customer PIN, based on the algorithms, seed data and corollary data. The HSM 114 encrypts the PIN using an injected key-encryption-key at function block 348. The HSM 114 may encrypt the PIN using any of a variety of encryption techniques. In accordance with the preferred embodiment, the encryption is performed using a dual-controlled, split-knowledge key, which has been injected into the HSM 114 using a smart card 116. The HSM 114 then generates a PIN block using the encrypted PIN at function block 350.

The HSM interface 110 sends the generated PIN block to the transaction manager at function block 352. The transaction manager 102 generates a transaction message using the transaction data and the PIN block at function block 354. The transaction manager 102 then sends the transaction message to the ATM Network 118 at function block 356. The ATM Network 118 sends an authorization request to the Financial Institution 120 at function block 358.

At decision block 360, the financial institution 120 determines if the transaction is authorized. If the transaction is not authorized, the process follows the NO path to function block 362 where financial institution 120 sends a "transaction denied" message to the transaction manager 102. The transaction manager 102 sends a "transaction denied" message to the merchant server 108 at function block 364. The process ends at block 500.

If the transaction is authorized, the process follows the YES path to function block 366. The financial institution 120 sends a "transaction approved" message to the transaction manager at function block 366. The transaction manager 102 sends a "transaction approved" message to the merchant server 108. The financial institution 120 debits the customer's account in accordance with the transaction data at function block 370. The process ends at block 500.

It will be appreciated by those skilled in the art having the benefit of this disclosure that this invention provides a secure PIN processing system and method It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A method of secure PIN processing in a network transaction between a terminal and a merchant server, wherein the merchant server establishes a network connection between the terminal and a transaction manager, such that the merchant server is not privy to data exchanged between the terminal and the transaction manager, the transaction manager performing the method comprising the steps of:

generating terminal data defining an unshared secret;

generating hardware security module (HSM) data defining an unshared secret;

sending the terminal data to the terminal, wherein the terminal generates corollary data relating to a PIN using the terminal data and user input data, the user input data based on user inputs received by the terminal;

receiving the corollary data from said terminal;

sending the corollary data and the HSM data to a hardware security module, wherein the hardware security module calculates the PIN based on the corollary data and the HSM data, and wherein the hardware security module encrypts the PIN and generates a PIN block that includes the encrypted PIN;

receiving the PIN block from said hardware security module, generating a transaction request including said PIN block and transmitting said transaction request for authentication of the PIN and the transaction;

determining whether a financial institution has authenticated the transaction; and notifying the merchant server whether the transaction has been authenticated based on the determining step.

2. The method of claim 1, wherein said terminal data includes at least one algorithm.

3. The method of claim 1, wherein said terminal data includes seed data.

4. The method of claim 1, wherein said user input data includes cursor location data.

5. The method of claim 1, further comprising the step of receiving transaction data from the terminal and including said transaction data in said transaction request.

6. The method of claim 1, wherein said encrypted PIN is encrypted using a split-knowledge key.

7. A system for secure PIN processing comprising:

a transaction manager for managing a transaction between a terminal and a merchant server, wherein the transaction manager generates terminal data defining an unshared secret, and wherein the transaction manager generates hardware security module (HSM) data defining an unshared secret;

a transaction module executed by the terminal and communicably connected to said transaction manager for receiving the terminal data from the transaction module, generating corollary data relating to a PIN using the terminal data and user input data, and sending the corollary data to the transaction manager, wherein the merchant server is not privy to data exchanged between the terminal and the transaction manager, wherein the user input data is based on user inputs received by the terminal;

a hardware security module communicably connected to said transaction manager for receiving the corollary data and the HSM data from the transaction manager, calculating the PIN based on the corollary data and the HSM data, encrypting the PIN and generating a PIN block that includes the encrypted PIN; and wherein said transaction manager receives the PIN block from said hardware security module, generates a transaction request including said PIN block, transmits said transaction request for authentication of the PIN and the transaction, determines whether a financial institution has authenticated the transaction, and notifies the merchant server whether the transaction has been authenticated.

8. The system of claim 7, wherein said transaction manager is communicably connected to said transaction module by an open network.

9. The system of claim 7, wherein said transaction manager is communicably connected to said hardware security module by a direct connection.

10. The system of claim 7 wherein said user input data comprises cursor location data.

11. The system of claim 7 wherein said terminal data includes an algorithm.

12. The system of claim 7 wherein said HSM data includes an algorithm.

* * * * *